US008359210B1

(12) United States Patent  
Altinger et al.

(10) Patent No.: US 8,359,210 B1  
(45) Date of Patent: Jan. 22, 2013

(54) METHOD AND SYSTEM FOR PROVIDING HEALTHCARE EXPENSE PAYMENT RECOMMENDATIONS

(75) Inventors: Richard Altinger, Los Altos, CA (US); Dawn M. Nidy, Belmont, CA (US); Lisa Herrup Rogers, Palo Alto, CA (US); Muhammet Serdar Akin, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 448 days.

(21) Appl. No.: 12/499,974

(22) Filed: Jul. 9, 2009

(51) Int. Cl.  
*G06Q 40/00* (2012.01)

(52) U.S. Cl. ............... 705/4; 705/2; 705/3; 705/40

(58) Field of Classification Search ........... 705/2–4, 705/15–45  
See application file for complete search history.

(56) References Cited

U.S. PATENT DOCUMENTS

| | | | | |
|---|---|---|---|---|
| 5,857,079 | A * | 1/1999 | Claus et al. ............... | 705/33 |
| 7,380,707 | B1 * | 6/2008 | Fredman ............... | 235/379 |
| 2004/0138999 | A1 * | 7/2004 | Friedman et al. ......... | 705/39 |

OTHER PUBLICATIONS

"Curb healthcare expenses when employees take ownership", The National Provisioner's Meat & Deli Retailer, May 2005, v4, n4, p. S3(3).*

* cited by examiner

*Primary Examiner* — Hai Tran  
(74) *Attorney, Agent, or Firm* — McKay and Hodgson, LLP; Philip McKay; Sean P. Lewis

(57) ABSTRACT

A method and system for providing healthcare expense payment recommendations whereby a computing system implemented data management system, such as a computing system implemented healthcare expense management system is provided and the computing system implemented data management system obtains data indicating that a given healthcare consumer utilizing the computing system implemented data management system has access to a healthcare expense account. The given healthcare consumer incurs a healthcare expense that is potentially eligible for payment using the healthcare expense account. The potentially eligible healthcare expense is then identified by the computing system implemented data management system and the healthcare consumer is prompted to consider using the healthcare expense account to pay the potentially eligible healthcare expense.

18 Claims, 3 Drawing Sheets

METHOD AND SYSTEM FOR PROVIDING HEALTHCARE EXPENSE PAYMENT RECOMMENDATIONS

BACKGROUND

Currently, there are several healthcare expense account programs available to healthcare consumers that are typically used in addition to, and often in conjunction with, traditional healthcare insurance. Herein, healthcare expense account programs are defined as programs which provide a healthcare consumer and/or a healthcare consumer's dependents a designated healthcare expense account that is assigned to the healthcare consumer and is used to either directly pay for, or reimburse the healthcare consumer for, defined eligible healthcare expenses incurred by the healthcare consumer and/or the healthcare consumer's dependents. Examples of currently available healthcare expense account programs include, but are not limited to: flexible spending accounts (FSAs); healthcare reimbursement arrangements (HRAs); and healthcare spending accounts (HSAs).

In many cases, the healthcare expense account is a virtual account maintained by a healthcare expense program administrator or management service, also called a program administrator, either under the direct control of an employer of the healthcare consumer and/or as a third-party agent of the employer. In other cases, the healthcare expense account is set up by the healthcare consumers themselves. Typically, healthcare expense accounts are funded by the healthcare consumer, the employer of the healthcare consumer, a given health plan, and/or any combination of these parties.

Healthcare expense account programs typically help the healthcare consumer pay healthcare expenses that are not covered by the healthcare consumer's healthcare insurance such as: deductibles; the healthcare consumer's portion of healthcare expenses; co-payments for doctors visits and prescriptions; co-payments for medical supplies and devices; extended care and/or home care; and various other healthcare expenses determined to be eligible by the employer and/or healthcare expense program administrator and/or the IRS.

In typical operation, funds are deposited in the healthcare expense account by the healthcare consumer, the employer, or a combination of both. Once the healthcare expense account is funded and/or funding arrangements, such as paycheck deduction and/or credit lines, are established, the funds are made available to reimburse the healthcare consumer for out-of-pocket expenses incurred by the healthcare consumer in eligible healthcare expense transactions, typically using pre-tax, or otherwise tax advantaged, funds. In some cases, the healthcare consumer first pays the healthcare expense using his or her own funds. Then the healthcare consumer makes a request to the program administrator for reimbursement of the funds. The healthcare consumer is then reimbursed for his or her out-of-pocket expenses from the healthcare expense account, typically using the pre-tax, or otherwise tax advantaged, funds.

In some cases, the healthcare consumer uses special debit/credit cards that are directly linked to the healthcare expense account and/or track healthcare expense transactions. In some cases, the healthcare expense is paid with special debit/credit cards that are directly linked to the healthcare expense account and then the healthcare expense must be substantiated using a receipt, bill or explanation of benefits document.

Some healthcare expense accounts, such as flexible spending accounts (FSAs), are "time limited healthcare expense accounts", also known as "use it or lose it accounts". Using typical time limited healthcare expense accounts, the healthcare consumer must elect to deposit a specified pre-tax dollar amount in the time limited healthcare expense account to cover healthcare expenses that the healthcare consumer predicts will occur over a predefined future period. For instance, as one example, the healthcare consumer must elect to deposit a pre-tax dollar amount specified by the healthcare consumer to be paid into the time limited healthcare expense account for pre-tax reimbursement of all eligible healthcare expenses to be incurred in the next 12 months. In many cases, the amount specified by the healthcare consumer is paid by deducting a portion of the specified amount from the healthcare consumer's compensation over multiple pay periods. In other cases, the employer makes contributions to the time limited healthcare expense account, i.e., the FSA, and the employer deposits funds in the time limited healthcare expense account on a periodic basis.

Using a typical time limited healthcare expense account, it is important that a healthcare consumer predict and monitor his or her total eligible healthcare expenses and activity fairly accurately. This is because any funds not used to reimburse the healthcare consumer for a transaction occurring within the predefined period, i.e., unused funds, are typically forfeited, typically back to the employer. A typical second requirement is that all applications for refunds, and/or substantiation documentation, must be made/submitted by a date defined by the plan.

In addition to the forfeiture of any unused funds at the end of the plan year, it is often the case that even though the funds are forfeited, this does not eliminate the requirement to pay taxes on these forfeited funds if such taxes are required.

On the other hand, a healthcare consumer of a time limited healthcare expense account typically wants to ensure that he or she does not unnecessarily incur potentially eligible healthcare expenses in a given plan year that exceed the time limited healthcare expense account funds available. This is because once the time limited healthcare expense account funds are gone, any further, otherwise eligible, healthcare expenses incurred in a given plan year must be paid using non-tax advantaged, i.e., post tax, funds.

Consequently, it is often the case that a healthcare consumer would want to closely monitor their balances in their healthcare expense accounts to ensure that he or she does not leave any healthcare expense account funds unused, thereby forfeiting money, or that he or she does not unnecessarily exceed the available healthcare expense account funds in a given plan year, thereby paying eligible medical expenses with post-tax dollars and losing the tax advantage of time limited healthcare expense account funds.

Currently, many healthcare consumers having access to healthcare expense accounts do not fully understand the operation of their healthcare expense accounts and/or what healthcare expenses are eligible for reimbursement, or payment, from, their healthcare expense accounts. In addition, some healthcare consumers having access to healthcare expense accounts simply forget they have the resource available to them until it is too late to use it.

In addition, many healthcare consumers having access to healthcare expense accounts find it difficult to access, and/or determine the balances in, their healthcare expense accounts.

In addition, as noted above, many healthcare expenses must be substantiated using a receipt, bill, or explanation of benefits document associated with the healthcare expenses charged to a healthcare expense account and, in many cases, this documentation must be properly submitted by strict deadlines in order to qualify. However, many healthcare consumers having access to healthcare expense accounts find the documentation process both confusing and overly burdensome, at times spending large amounts of time collecting, copying, and faxing and/or mailing, documents out, all to be reimbursed for what are often small expenses, such as a $20.00 co-pay.

As a result of the situation described above, many healthcare consumers having access to healthcare expense accounts find their operation confusing and use them improperly. In addition, because of the confusing surrounding the operation of healthcare expense accounts, employer HR representatives and/or program administrators often end up devoting significant amounts of time to answering questions regarding healthcare expense accounts. Consequently, many employers are hesitant to offer these programs and many healthcare consumers having access to healthcare expense accounts consider the healthcare expense accounts too confusing and time consuming to be worth their effort. Therefore, many healthcare consumers having access to healthcare expense accounts do not take advantage of these well-meaning and potentially very helpful benefit programs.

SUMMARY

In accordance with one embodiment, a method and system for providing healthcare expense payment recommendations includes a process for providing healthcare expense payment recommendations whereby a computing system implemented data management system, such as a computing system implemented healthcare expense management system is provided. In one embodiment, the computing system implemented data management system obtains data indicating that a given healthcare consumer utilizing the computing system implemented data management system has access to a healthcare expense account. In one embodiment, the given healthcare consumer incurs a healthcare expense that is potentially eligible for payment using the healthcare expense account. In one embodiment, the potentially eligible healthcare expense is identified by the computing system implemented data management system and the healthcare consumer is prompted through the computing system implemented data management system to consider using the healthcare expense account.

In accordance with one embodiment, the computing system implemented data management system can be any computing system implemented data management system such as, but not limited to: computing system implemented healthcare expense management systems, packages, programs, modules, or applications; computing system implemented personal and small business healthcare management systems, packages, programs, modules, or applications; computing system implemented personal and business financial management systems, packages, programs, modules, or applications; computing system implemented healthcare service provider office management systems, packages, programs, modules, or applications; and various other electronic data driven data management systems, packages, programs, modules, or applications, whether known at the time of filling or as developed later.

In accordance with one embodiment, the computing system implemented data management system is used by the healthcare consumer to manage their expenses, including their healthcare expenses, and to make payments, including healthcare expense payments.

In one embodiment, the computing system implemented data management system is used to help the healthcare consumer manage their finances and transactions, including healthcare related finances and transactions, by providing a centralized interface for obtaining transactional data from multiple sources and electronically identifying and categorizing transactions and items. In one embodiment, the computing system implemented data management system obtains electronic transaction data and categorizes the data based on various included information such as payee, payment amount, items purchased, date of purchase, healthcare service codes, healthcare procedure codes, healthcare diagnosis codes, healthcare insurance codes, AMA codes, etc. via communication with banks, credit card providers or other financial institutions, healthcare insurance providers, healthcare service providers, and/or points of sale, using electronic data transfer systems such as the Open Medical Exchange (OMX), the Open Financial Exchange (OFX) specification, or various other systems for transferring data.

In one embodiment, the computing system implemented data management system has the ability to identify and categorize specific transactions as a given "type" or "category" of transaction, such a "healthcare expense transaction" or a "business transaction", or a "personal transaction". In one embodiment, the computing system implemented data management system includes an automatic categorization feature whereby a category for specific transactions is semi-automatically, and/or automatically, assigned, and/or suggested, by a computing system implemented data management system based on various, typically proprietary, categorization schemes and/or algorithms.

In accordance with one embodiment, the computing system implemented data management system is a computing system implemented healthcare expense management system that provides all of the features discussed above for healthcare expenses and then provides the healthcare consumer the capability to pay the healthcare expenses through the computing system implemented data management system using any one of several payment methods available to the healthcare consumer including, but not limited to: credit cards; debit cards; funds transfers; and checks. One example of a computing system implemented healthcare expense management system is Quicken Health Expense Tracker, available from Intuit Inc., of Mountain View, Calif.

In one embodiment, the computing system implemented data management system obtains data indicating that a given healthcare consumer utilizing the computing system implemented data management system has access to a healthcare expense account. Examples of common healthcare expense account programs currently available include, but are not limited to: flexible spending accounts (FSAs); healthcare reimbursement arrangements (HRAs); and healthcare spending accounts (HSAs). Each of these healthcare expense account programs operate to reimburse the healthcare consumer for out of pocket expenses incurred by the healthcare consumer in eligible healthcare expense transactions. However, the funding, lifespan, and portability of these three programs vary significantly.

For instance, in a typical flexible spending account (FSA) program the healthcare consumer must elect to deposit a specified pre-tax dollar amount in the healthcare expense account, i.e., the FSA, to cover healthcare expenses that will occur over a predefined future period. For instance, as one example, the healthcare consumer must elect to deposit a pre-tax dollar amount specified by the healthcare consumer to be paid into the healthcare expense account for pre-tax reimbursement of all eligible healthcare expenses to be incurred in the next 12 months. In many cases, the amount specified by the healthcare consumer is paid by deducting a portion of the specified amount from the healthcare consumer's compensation over multiple pay periods. In other cases, the employer makes contributions to the FSA and the employer deposits funds in the healthcare expense account on a periodic basis.

Using a typical FSA, it is important that a healthcare consumer predict his or her total eligible healthcare expenses fairly accurately. This is because any funds not used to reimburse the healthcare consumer for a transaction occurring within the predefined period, i.e., unused funds, are typically forfeited. Consequently, it is often the case a healthcare consumer would want to utilize FSA funds to pay and/or reimburse healthcare expenses first in order to ensure that he or she does not forfeit any money. However, there are exceptions and the preferred use of FSA funds will vary from healthcare consumer-to-healthcare consumer and situation-to-situation. FSAs are currently the most common form of healthcare expense account programs.

A typical healthcare reimbursement arrangement (HRA) account is very similar to an FSA account except that the HRA account is typically funded by the employer and, in many cases, the healthcare expense account balance remains available to healthcare consumer as long as the healthcare consumer is employed by the employer. Given that HRA funds are kept by the healthcare consumer so long as the healthcare consumer is an employee, HRA funds are often a preferred second source of funding for healthcare expenses, after FSA funds, when both programs are available. However, this is not always the case, particularly if a healthcare consumer plans to change jobs before the end of an FSA predefined period. In addition, certain rates of return and interest considerations may dictate that the HRA funds be used sooner, or, in other cases, later.

Healthcare spending accounts (HSAs) are a federal program whereby a healthcare consumer and/or employer fund the healthcare spending account themselves with pre-tax dollars. The healthcare consumer then reimburses him or herself from the HSA account for eligible healthcare expenses. An HSA is unique in that the account typically remains the property of the healthcare consumer for life. However, funds drawn from the HSA account prior to the defined retirement age must be identified, accounted for, and verified through special tax documentation. Two features make the HSA program unique. First, as noted, the funds remain available to the healthcare consumer for the healthcare consumer's lifetime. In addition, currently, there are few limits on the retroactive use of HSA funds; that is to say, HSA funds can be used to reimburse healthcare expenses years after the expenses are incurred. These unique features of an HSA account often mean that these funds should be preferably accessed only after other sources are depleted, such as FSA or HRA funds. In some cases, if the HSA has a particularly favorable rate of return and/or interest rate, a healthcare consumer may even elect to use tradition checking, savings, debit card, or even credit card, accounts before using HSA funds. However, there are exceptions, and the preferred use of HSA funds will vary from healthcare consumer-to-healthcare consumer and situation-to-situation.

Any healthcare expense account program, whether it be an FSA, an HRA, an HSA, or any other healthcare expense account-type program, known at the time of filing or as developed thereafter, can be used with, and benefit from, the process for providing healthcare expense payment recommendations disclosed herein.

In one embodiment, when the computing system implemented data management system obtains data indicating that a given healthcare consumer utilizing the computing system implemented data management system has access to a healthcare expense account, the computing system also obtains data regarding the balance of in the healthcare expense account and/or any conditions or critical dates associated with the healthcare expense account, such as the "use it or lose it" cut-off date.

In one embodiment, when the computing system implemented data management system obtains data indicating that a given healthcare consumer utilizing the computing system implemented data management system has access to a healthcare expense account, the computing system also obtains general, or in some embodiments specific, data regarding the operating rules associated with the healthcare expense account.

In one embodiment, when the computing system implemented data management system obtains data indicating that a given healthcare consumer utilizing the computing system implemented data management system has access to a healthcare expense account, the computing system also obtains data regarding the operation of the healthcare expense account such as, but not limited to, data representing eligible transactions and terms of use under the one or more accounts and/or interest rates/rates of return associated with the healthcare expense account.

In one embodiment, the computing system implemented data management system obtains data indicating that a given healthcare consumer utilizing the computing system implemented data management system has access to a healthcare expense account, and any other data associated with the healthcare expense account, by the user providing the data, in one embodiment, by entering the data into a computing system implementing the computing system implemented data management system using a user interface device such as, but not limited to: a keyboard; a mouse; a touchpad; voice recognition software; or any other device and/or system capable of providing user input to a computing system and/or for translating user actions into computing system operations, whether available or known at the time of filing or as developed later.

In one embodiment, the computing system implemented data management system obtains data indicating that a given healthcare consumer utilizing the computing system implemented data management system has access to a healthcare expense account by identifying symbol strings and/or digit sequences unique to healthcare expense account debit and/or credit cards used by the healthcare consumer to pay an expense through the computing system implemented data management system. This embodiment relies on the fact that and/or credit cards issued in association with healthcare expense accounts have specific symbol strings and/or digit sequences that are used only for debit and/or credit cards issued in association with healthcare expense accounts.

In one embodiment, the computing system implemented data management system obtains data indicating that a given healthcare consumer utilizing the computing system implemented data management system has access to a healthcare expense account, and any other data associated with the healthcare expense account, by obtaining data indicating the healthcare consumer's employer from the healthcare consumer's financial data and then obtaining data about employee benefits offered by that employer.

In one embodiment, the computing system implemented data management system obtains data indicating that a given healthcare consumer utilizing the computing system implemented data management system has access to a healthcare expense account, and any other data associated with the healthcare expense account, by analysis of the healthcare consumer's tax records and/or transaction history.

In one embodiment, the computing system implemented data management system obtains data indicating that a given healthcare consumer utilizing the computing system implemented data management system has access to a healthcare expense account, and any other data associated with the healthcare expense account, by any method, means, mechanism, and/or system, for determining that a given healthcare consumer utilizing the computing system implemented data management system has access to a healthcare expense account as discussed herein, and/or as known in the art at the time of filing, and/or as developed after the time of filing.

In one embodiment, the given healthcare consumer incurs a healthcare expense that is potentially eligible for payment using the healthcare expense account in the current billing period. In one embodiment, the given healthcare consumer incurs a healthcare expense that is potentially eligible for payment using the healthcare expense account in a previous billing period and that has, in one embodiment, already been paid for using a means other than the healthcare expense account.

In one embodiment, the potentially eligible healthcare expense is identified by the computing system implemented data management system when it appears as a transaction, or other entry, in the computing system implemented data management system.

As noted above, in one embodiment, the computing system implemented data management system has the ability to identify and categorize specific financial transactions and/or items as a given "type" or "category" of transaction or item, such as a "healthcare expense transaction" or a "healthcare expense item". In one embodiment, specific transactions and/or items identified as healthcare expense transactions, or healthcare expense items, are automatically identified as potentially eligible healthcare expenses.

In some embodiments, the computing system implemented data management system has access to data regarding the generalized, or specific, operational rules associated with the healthcare expense account and, in particular, what types of healthcare expenses are potentially eligible for purchase using the healthcare expense account. In these embodiments, specific transactions and/or items are identified as potentially eligible healthcare expenses using the data regarding the generalized, or specific, operational rules associated with the healthcare expense account.

In one embodiment, specific transactions and/or items are identified as potentially eligible healthcare expenses by the healthcare consumer and/or are identified as potentially eligible healthcare expenses based on analysis of historical categorizations of similar specific transactions and/or items.

In one embodiment, specific transactions and/or items are identified as potentially eligible healthcare expenses by any method, means, mechanism, and/or system for identifying specific transactions and/or items as potentially eligible healthcare expenses, as discussed herein, and/or as known in the art at the time of filing, and/or as developed after the time of filing.

In one embodiment, once a specific transaction and/or item is identified as a potentially eligible healthcare expense by the computing system implemented data management system the healthcare consumer is prompted through the computing system implemented data management system to consider using the healthcare expense account.

In one embodiment, once a specific transaction and/or item is identified as a potentially eligible healthcare expense by the computing system implemented data management system, if the healthcare consumer attempts to pay the potentially eligible healthcare expense by any means other than using the healthcare consumer's healthcare expense account, the healthcare consumer is prompted through the computing system implemented data management system to consider using the healthcare expense account.

In one embodiment, the healthcare consumer is prompted through the computing system implemented data management system to consider using the healthcare expense account via a pop-up display or other sub-display on a display screen of a computing system implementing the computing system implemented data management system.

In one embodiment, the healthcare consumer is prompted through the computing system implemented data management system to consider using the healthcare expense account and is provided data indicating the balance in the healthcare expense account.

In one embodiment, the healthcare consumer is prompted through the computing system implemented data management system to consider using the healthcare expense account and is provided data indicating any critical dates associated with the healthcare expense account, such as the "use it or lose it" cut off date.

In one embodiment, if the healthcare consumer uses the healthcare expense account to pay the potentially eligible healthcare expense through the computing system implemented data management system, the computing system implemented data management system provides the healthcare consumer with instructions for filing a claim and/or any supporting documentation to the healthcare expense account administrator.

In one embodiment, if the healthcare consumer uses the healthcare expense account to pay the potentially eligible healthcare expense through the computing system implemented data management system, the computing system implemented data management system proactively e-files a claim and/or the supporting documentation to the healthcare expense account administrator on behalf of the healthcare consumer.

Using the method and system for providing healthcare expense payment recommendations disclosed herein, healthcare consumers having access to healthcare expense accounts are provided guidance regarding the operation of the healthcare expense accounts and are alerted to opportunities to utilize their healthcare expense accounts. Therefore, using the method and system for providing healthcare expense payment recommendations disclosed herein, healthcare consumers are benefited by being given the understanding and opportunity to properly use their healthcare expense accounts. In addition, employer HR representatives and/or program administrators can save the significant amounts of time currently being devoted to answering questions regarding healthcare expense accounts. Consequently, using the method and system for providing healthcare expense payment recommendations disclosed herein, it is more likely: the healthcare consumer will partake in one or more healthcare expense account programs; the healthcare expense account programs will be healthcare consumer and employer friendly; and/or the healthcare consumer will perceive the healthcare expense account programs to be the true benefit they are intended to be.

As discussed in more detail below, using the below embodiments, with little or no modification and/or healthcare consumer input, there is considerable flexibility, adaptability, and opportunity for customization to meet the specific needs of various healthcare consumers under numerous circumstances.

Figure 1:
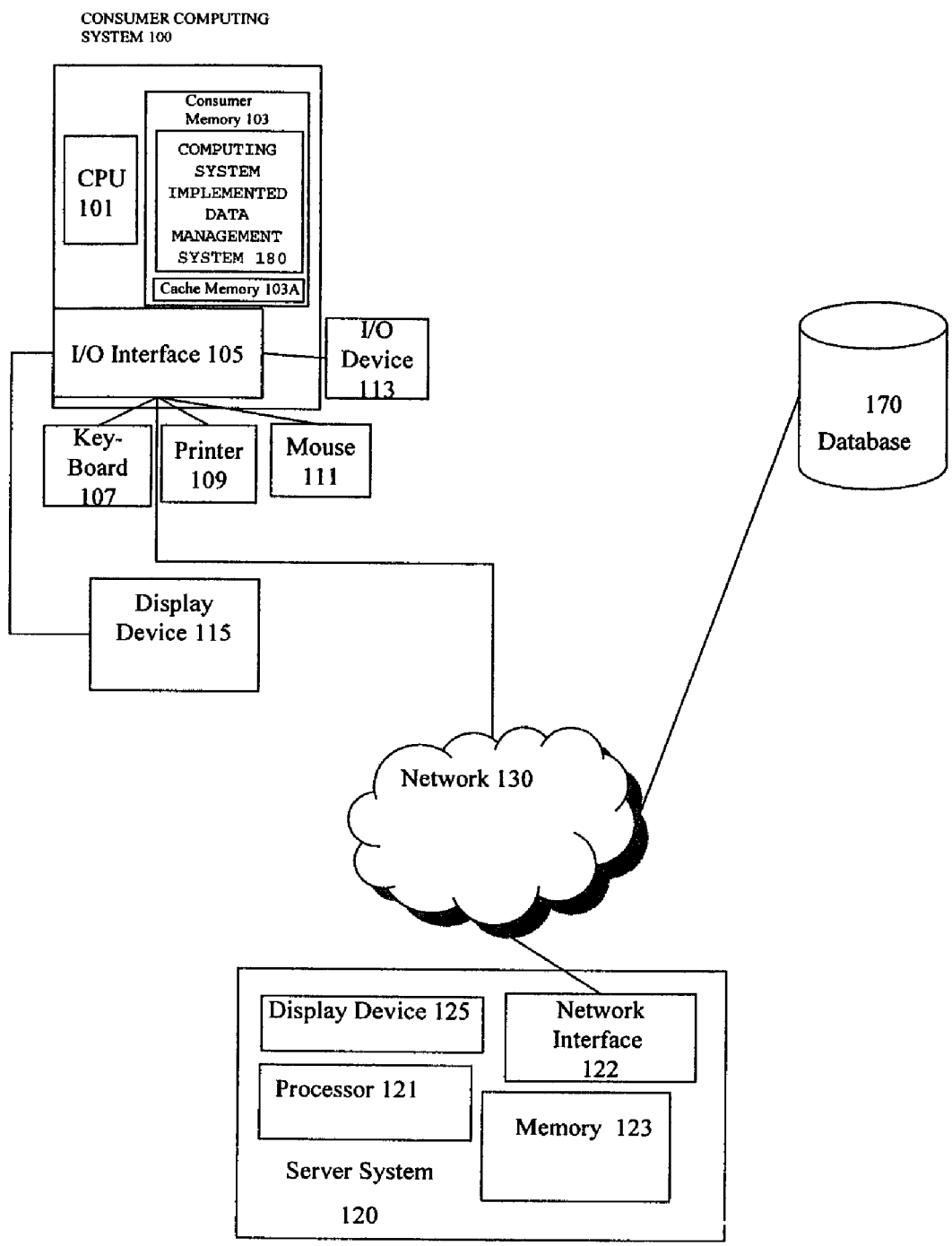
FIG. 1 is a block diagram of an exemplary hardware architecture for implementing one embodiment including a consumer computing system, a server computing system, a database, and a network.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for providing healthcare expense payment recommendations includes a process for providing healthcare expense payment recommendations whereby a computing system implemented data management system, such as a computing system implemented healthcare expense management system is provided. In one embodiment, the computing system implemented data management system obtains data indicating that a given healthcare consumer utilizing the computing system implemented data management system has access to a healthcare expense account. In one embodiment, the given healthcare consumer incurs a healthcare expense that is potentially eligible for payment using the healthcare expense account. In one embodiment, the potentially eligible healthcare expense is identified by the computing system implemented data management system and the healthcare consumer is prompted through the computing system implemented data management system to consider using the healthcare expense account.

FIG. 1 is a block diagram of an exemplary hardware architecture for implementing one embodiment of a system and method for providing healthcare expense payment recommendations, such as exemplary process 300 (FIG. 3) discussed herein, that, returning to FIG. 1, includes: a consumer computing system 100, e.g., a first computing system; a server computing system 120, e.g., a second computing system; and a database 170, all operatively coupled by a network 130.

As seen in FIG. 1, consumer computing system 100 typically includes one or more central processing units, CPU(s) 101, an input/output (I/O) interface 105, and a consumer memory 103, including cache memory 103A. As discussed in more detail below, in one embodiment, consumer memory 103 includes all, or part, of instructions and data associated with a process for providing healthcare expense payment recommendations 300 (see FIG. 3), and, in particular, a computing system implemented data management system 180.

Returning to FIG. 1, consumer computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, consumer computing system 100, whether available or known at the time of filing or as later developed.

In one embodiment, consumer computing system 100 is a computing system accessible by one or more users. In one embodiment, consumer computing system 100 is used, and/or accessible, by another computing system, such as server computing system 120 (discussed below).

In one embodiment, consumer computing system 100 is representative of multiple consumer computing systems. In one embodiment, consumer computing system 100 is representative of a webpage, or web-based system. In one embodiment, consumer computing system 100 is a server computing system. In various embodiments, consumer computing system 100 is any computing system as defined herein and/or as known in the art at the time of filing and/or as developed thereafter, that includes components that can execute all, or part, of a process for providing healthcare expense payment recommendations in accordance with at least one of the embodiments as described herein.

As also seen in FIG. 1, server computing system 120 typically includes one or more central processing units, processor 121, a network interface 122, a memory 123, and a display device 125.

In one embodiment, server computing system 120 is used, and/or is accessible, by another computing system, such as consumer computing system 100.

In one embodiment, server computing system 120 is representative of multiple computing systems. In one embodiment, server computing system 120 is representative of a webpage, or web-based system. In one embodiment, server computing system 120 is a web-server computing system. In various embodiments, server computing system 120 is any computing system as defined herein and/or as known in the art at the time of filing and/or as developed thereafter, that includes components that can execute all, or part, of a process for providing healthcare expense payment recommendations in accordance with at least one of the embodiments as described herein.

Also shown in FIG. 1 is database 170. In one embodiment, database 170 is a data storage device, a designated server system or computing system, or a designated portion of one or more server systems or computing systems, such as computing system 100 and/or server computing system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for providing healthcare expense payment recommendations.

In one embodiment, data associated with a process for providing healthcare expense payment recommendations and/or data associated with one or more healthcare expense accounts, is stored, in whole, or in part, in database 170, and is used by, or is accessed by, a process for providing healthcare expense payment recommendations. In one embodiment, database 170 is accessible by one or more users. In one embodiment, database 170 is used, and/or accessible, by a computing system, such as computing system 100.

In one embodiment, computing systems 100 and 120, and database 170, are communicably coupled through network 130. Network 130 can be any network or network system as defined herein, and/or known in the art at the time of filing, and/or as developed after the time of filing, capable of allowing communication between two or more computing systems, server systems, and/or databases.

In one embodiment, computing systems 100 and 120, database 170, and network 130 are part of a cloud computing environment.

Those of skill in the art will readily recognize that the components shown in FIG. 1, such as computing systems 100 and 120, and database 170, and their respective components, are shown for illustrative purposes only and that architectures with more or fewer components can implement, and benefit from, one or more embodiments. Moreover, one or more components of consumer computing system 100, server computing system 120, and database 170, may be located remotely from their respective system and accessed via network 130. In addition, the particular type of, and configuration of, computing systems 100 and 120 are not relevant.

Figure 3:
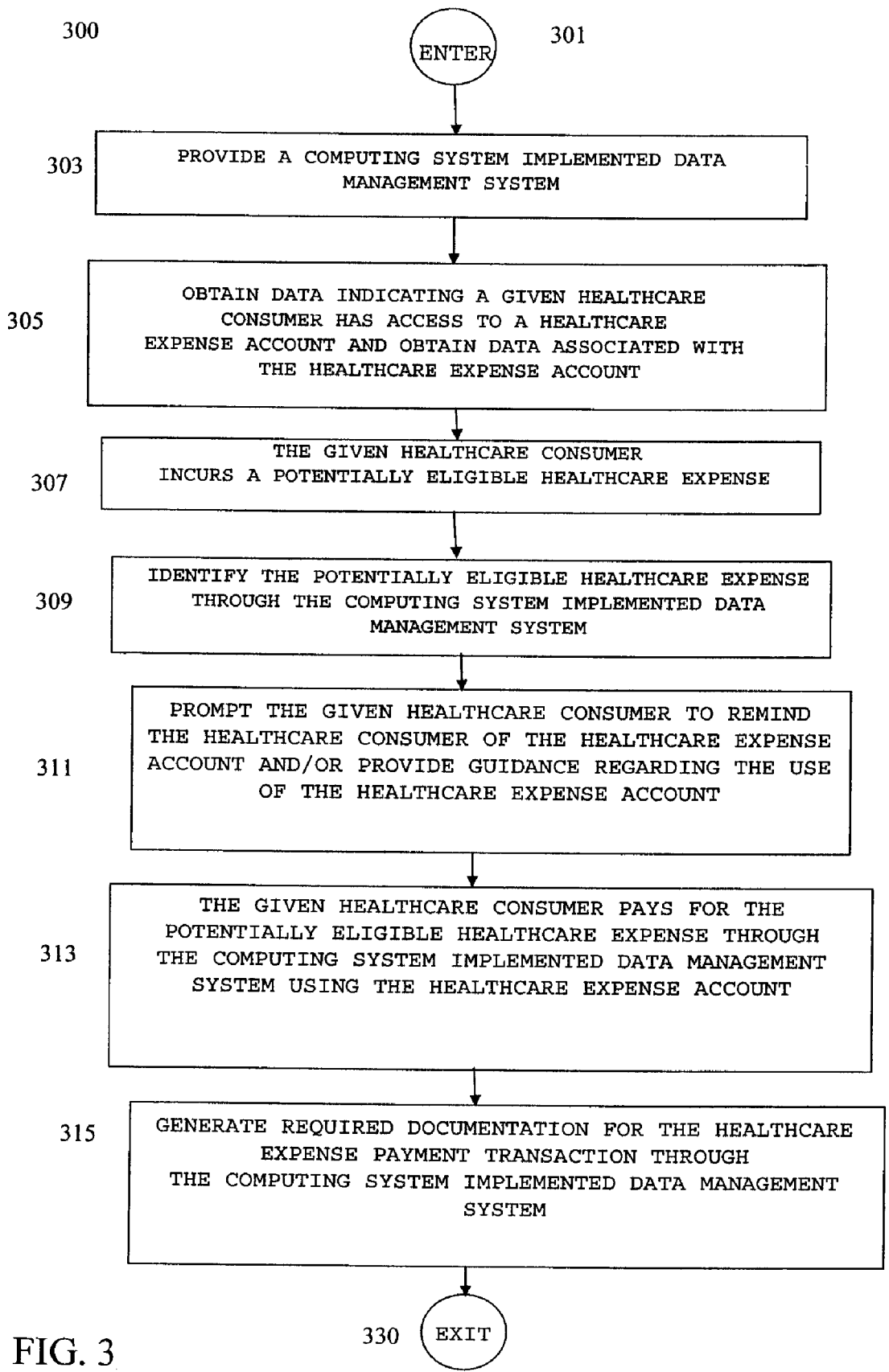
FIG. 3 is an exemplary flow chart illustrating one embodiment of a process for providing healthcare expense payment recommendations.

As discussed above, in one embodiment, at least part of consumer memory 103 includes all, or part, of instructions and data associated with a process for providing healthcare expense payment recommendations 300 (see FIG. 3).

Figure 2:
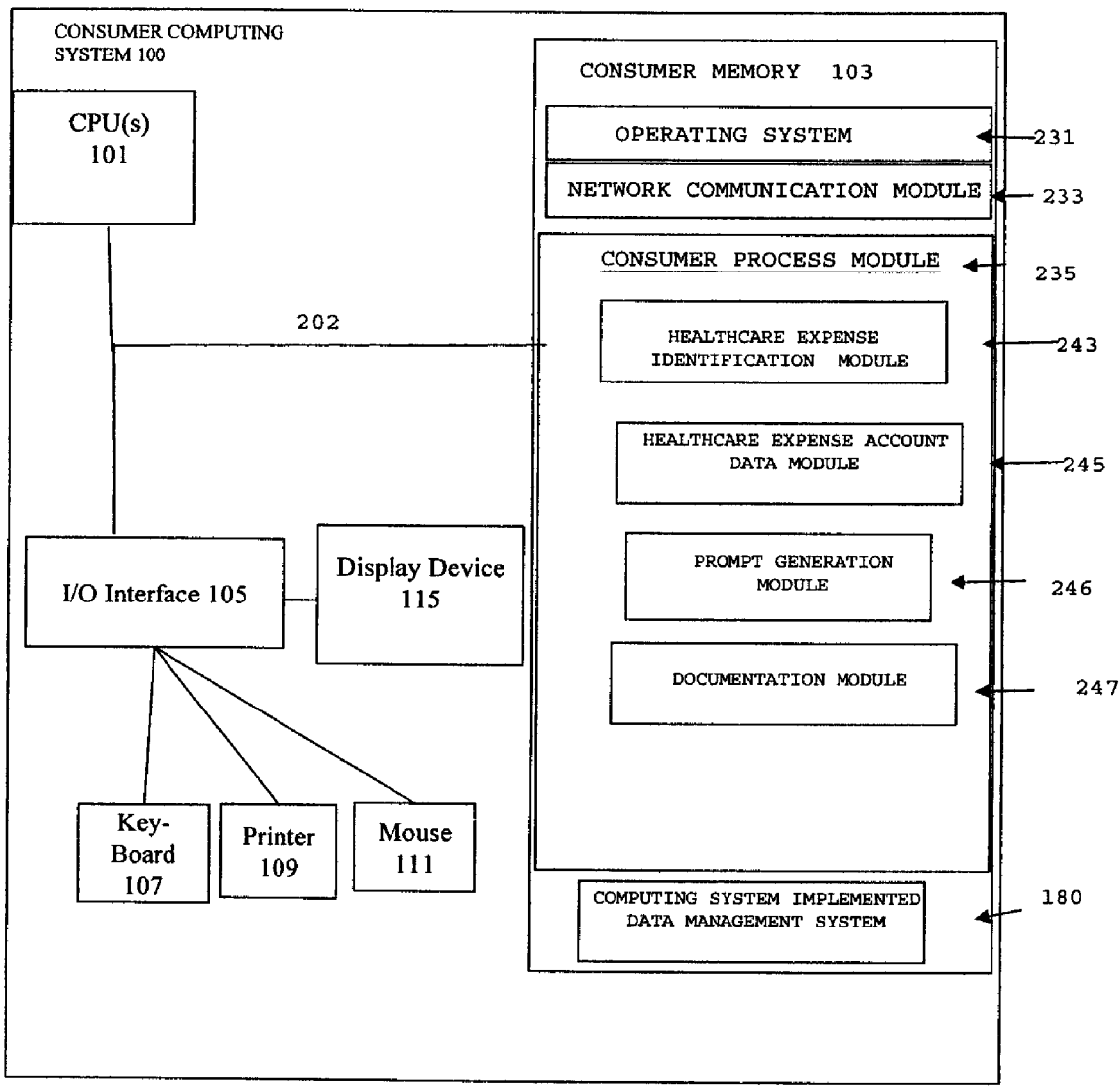
FIG. 2 is a block diagram showing more detail of an exemplary consumer computing system in accordance with one embodiment.

FIG. 2 is a more detailed block diagram of an exemplary consumer computing system 100 (FIG. 1). As seen in FIG. 2, in one embodiment, consumer computing system 100 includes one of more Central Processing Unit(s), CPU(s) 101; consumer memory 103; an Input/Output interface, I/O interface 105, including one or more user interface devices such as display device 115, keyboard 107, printer 109, and/or mouse 111; all interconnected by one or more communication buses 202.

As also seen in FIG. 2, in one embodiment, consumer memory 103 can store data and/or instructions associated with, but not limited to, the following elements, subsets of elements, and/or super sets of elements for processing by one or more processors, such as CPU(s) 101 (FIG. 2) and/or 121 (FIG. 1): operating system 231 that includes procedures, data, and/or instructions for handling various services and performing/coordinating hardware dependent tasks; network communications module 233 that includes procedures, data, and/or instructions, for connecting consumer computing system 100 to other computing systems, such as another consumer computing system 100 and/or server computing system 120 of FIG. 1, and/or a network, such as network 130 of FIG. 1, and/or a database, such as database 170 of FIG. 1; computing system implemented data management system 180 (FIG. 2) that includes procedures, data, and/or instructions, for implementing at least part of a computing system implemented data management system; and consumer process module 235 that includes procedures, data, and/or instructions, for implementing at least part of process for providing healthcare expense payment recommendations 300 (FIG. 3).

As also seen in FIG. 2, in one embodiment, consumer process module 235 of consumer memory 103 includes healthcare expenses identification module 243 that includes procedures, data, and/or instructions for indentifying that a given healthcare consumer utilizing the computing system implemented data management system has access to a healthcare expense account.

As also seen in FIG. 2, in one embodiment, consumer process module 235 of consumer memory 103 includes healthcare expense account data module 245 that includes procedures, data, and/or instructions for: obtaining and storing data regarding the operating rules associated with the healthcare expense account; obtaining and storing data regarding the operation of the healthcare expense account such as, but not limited to, data representing eligible transactions and terms of use under the one or more accounts and/or interest rates/rates of return associated with the healthcare expense account; and various other data associated with the healthcare expense account.

As also seen in FIG. 2, in one embodiment, consumer process module 235 of consumer memory 103 includes prompt generation module 246 that includes procedures, data, and/or instructions for, in one embodiment, prompting a healthcare consumer through the computing system implemented data management system to consider using the healthcare expense account and/or indicating any critical dates associated with the healthcare expense account, such as the "use it or lose it" cut off date.

As also seen in FIG. 2, in one embodiment, consumer process module 235 of consumer memory 103 includes documentation module 247 that includes procedures, data, and/or instructions for, in one embodiment, providing the healthcare consumer with instructions for filing a claim and/or any supporting documentation to the healthcare expense account administrator and/or e-filing a claim and/or the supporting documentation to the healthcare expense account administrator on behalf of the healthcare consumer.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 and discussed herein do not limit the scope as claimed below.

A more detailed discussion of the operation of exemplary consumer computing system 100, consumer memory 103, computing system implemented data management system 180, and consumer process module 235 of consumer memory 103 is provided below with respect to FIG. 3.

Process

Herein, the terms "healthcare consumer" and/or "consumer" are used interchangeably to denote the beneficiary of a healthcare expense account program and/or the beneficiary's dependents and/or designated agent of the beneficiary.

Herein, the term "employer" is used to denote the party offering the healthcare expense account program as a benefit to the "healthcare consumer".

Herein, the terms "program administrator", "program manager", "healthcare expense account program administrator", healthcare expense account program, "control mechanism"; and/or "healthcare expense account program manager" are used interchangeably to denote the party, mechanism, process, and/or device charged with administrating, processing, and making payments associated with healthcare expenses incurred by the "healthcare consumer".

The embodiments discussed below, include discussions of payments made for healthcare expenses. However, this choice was made for illustrative purposes and, in other embodiments, other expenses such as childcare/daycare, and or other more general "expenses" can be paid by accessing the various healthcare expense accounts and/or traditional credit and/or debit accounts discussed herein. Consequently, the choice of discussions of payments made for healthcare expenses is not limiting to the invention as claimed below.

Herein, the term "healthcare service provider" and/or "healthcare services provider", and/or "healthcare provider" include any individual person, persons, agencies, institutions, organizations, businesses, and/or other entities that provide medical treatment, medications, therapy, advice, and/or equipment. For example, herein, the term "healthcare service provider" includes, but is not limited to: doctors; nurses; technicians; therapists; pharmacists; laboratories; counselors; alternative medicine practitioners; medical facilities; doctor's offices; hospitals; emergency rooms; clinics; urgent care centers; alternative medicine clinics/facilities; physical therapy clinics/facilities; and any other entity providing general and/or specialized treatment, assessment, maintenance, therapy, medication, and/or advice relating to all, or any portion of, a healthcare service consumer's state of health, including but not limited to: general medical, specialized medical, surgical, dental, vision, psychological, and/or any other type of treatment, assessment, maintenance, therapy, medication, and/or advice.

Herein, the terms "healthcare" and/or "healthcare service" include any general and/or specialized treatment, assessment, maintenance, therapy, medication, and/or advice relating to all, or any portion of, a healthcare service consumer's state of health, including but not limited to: general medical, specialized medical, surgical, dental, vision, psychological, and/or any other type of treatment, assessment, maintenance, therapy, medication, and/or advice.

Herein, the term "medical treatment" includes, but is not limited to: one or more medications and/or medication regimes; physical therapy; recommended dietary changes; lab work, recommended activity level changes; other lifestyle changes; and/or surgical procedures; and/or any prescribed and/or suggested regime, medication, treatment, activity, avoided activity, and/or program designed to improve, maintain, and/or slow the degradation of, a healthcare service consumer's state of health.

Herein, the terms "healthcare insurance plan", "healthcare benefit plan", and "health insurance program" are used interchangeably to denote any policy, program, means and/or mechanism whereby a healthcare service consumer is provided healthcare benefits and/or healthcare services and/or entitlements to any from of healthcare.

Herein, the terms "healthcare insurance provider", "healthcare insurance service provider", "health insurance plan provider" and "health services insurance provider" are used interchangeably to denote any individual person, persons, agencies, institutions, organizations, businesses, and/or other entities that provide one or more healthcare insurance plans.

Herein, the terms "healthcare insurance plan administrator", "healthcare insurance service plan administrator", "health insurance plan administrator" and "health services insurance plan administrator" are used interchangeably to denote any individual person, persons, agencies, institutions, organizations, businesses, and/or other entities that administer and/or regulate and/or monitor one or more healthcare insurance plans.

As used herein, the term "computing system implemented data management system" includes, but is not limited to: computing system implemented healthcare expense management systems, packages, programs, modules, or applications; computing system implemented personal and small business healthcare management systems, packages, programs, modules, or applications; computing system implemented personal and business financial management systems, packages, programs, modules, or applications; computing system implemented healthcare service provider office management systems, packages, programs, modules, or applications; and various other electronic data driven data management systems, packages, programs, modules, or applications, whether known at the time of filling or as developed later.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and system for providing healthcare expense payment recommendations includes a process for providing healthcare expense payment recommendations whereby a computing system implemented data management system, such as a computing system implemented healthcare expense management system is provided. In one embodiment, the computing system implemented data management system obtains data indicating that a given healthcare consumer utilizing the computing system implemented data management system has access to a healthcare expense account. In one embodiment, the given healthcare consumer incurs a healthcare expense that is potentially eligible for payment using the healthcare expense account. In one embodiment, the potentially eligible healthcare expense is identified by the computing system implemented data management system and the healthcare consumer is prompted through the computing system implemented data management system to consider using the healthcare expense account.

FIG. 3 a flow chart depicting a process for providing healthcare expense payment recommendations 300 in accordance with one embodiment. Process for providing healthcare expense payment recommendations 300 begins at ENTER OPERATION 301 of FIG. 3 and process flow proceeds to PROVIDE A COMPUTING SYSTEM IMPLEMENTED DATA MANAGEMENT SYSTEM OPERATION 303.

In one embodiment, at PROVIDE A COMPUTING SYSTEM IMPLEMENTED DATA MANAGEMENT SYSTEM OPERATION 303 a computing system implemented data management system, such as computing system implemented data management system 180 of FIG. 1, is provided.

In one embodiment, at PROVIDE A COMPUTING SYSTEM IMPLEMENTED DATA MANAGEMENT SYSTEM OPERATION 303 a computing system implemented data management system, such as a computing system implemented healthcare expense management system is provided.

In one embodiment, at PROVIDE A COMPUTING SYSTEM IMPLEMENTED DATA MANAGEMENT SYSTEM OPERATION 303 the computing system implemented data management system can be any computing system implemented data management system such as, but not limited to: computing system implemented healthcare expense management systems, packages, programs, modules, or applications; computing system implemented personal and small business healthcare management systems, packages, programs, modules, or applications; computing system implemented personal and business financial management systems, packages, programs, modules, or applications; computing system implemented healthcare service provider office management systems, packages, programs, modules, or applications; and various other electronic data driven data management systems, packages, programs, modules, or applications, whether known at the time of filling or as developed later.

In one embodiment, the computing system implemented data management system provided at PROVIDE A COMPUTING SYSTEM IMPLEMENTED DATA MANAGEMENT SYSTEM OPERATION 303 is used by a given healthcare consumer to manage their expenses, including their healthcare expenses, and to make payments, including healthcare expense payments.

In one embodiment, the computing system implemented data management system provided at PROVIDE A COMPUTING SYSTEM IMPLEMENTED DATA MANAGEMENT SYSTEM OPERATION 303 is used by the given healthcare consumer to help manage their finances and transactions, including healthcare related finances and transactions, by providing a centralized interface for obtaining transactional data from one or more sources and electronically identifying and categorizing transactions and items. In various embodiments, the one or more sources include, but are not limited to: Explanations Of Benefits (EOBs); healthcare insurance providers; healthcare service providers; various merchants; one or more banks, credit card companies and/or other financial institutions; and any other source of the data, and, in particular healthcare related data, discussed herein, and/or known in the art at the time of filing, and/or as developed after the time of filing.

In one embodiment, the computing system implemented data management system provided at PROVIDE A COMPUTING SYSTEM IMPLEMENTED DATA MANAGEMENT SYSTEM OPERATION 303 obtains electronic transaction data and categorizes the data based on various included information such as amounts covered by the healthcare consumer's insurance, co-payment amounts, patient responsibility amounts, deductibles, payee, payment amount, items purchased, date of purchase, healthcare service codes, healthcare insurance codes, AMA codes, etc. via communication with banks, credit card providers or other financial institutions, healthcare insurance providers, healthcare service providers, and/or points of sale, using electronic data transfer systems such as the Open Financial Exchange (OFX) specification, or various other systems for transferring data.

In one embodiment, the computing system implemented data management system provided at PROVIDE A COMPUTING SYSTEM IMPLEMENTED DATA MANAGEMENT SYSTEM OPERATION 303 has the ability to identify and categorize specific transactions as a given "type" or "category" of transaction, such a "healthcare expense transaction" or a "business transaction", or a "personal transaction".

In one embodiment, the computing system implemented data management system provided at PROVIDE A COMPUTING SYSTEM IMPLEMENTED DATA MANAGEMENT SYSTEM OPERATION 303 includes an automatic categorization feature whereby a category for specific transactions is semi-automatically, and/or automatically, assigned, and/or suggested, by a computing system implemented data management system based on various categorization schemes and/or algorithms.

In one embodiment, the computing system implemented data management system provided at PROVIDE A COMPUTING SYSTEM IMPLEMENTED DATA MANAGEMENT SYSTEM OPERATION 303 is a computing system implemented healthcare expense management system that provides all of the features discussed above for healthcare expenses and then provides the healthcare consumer the capability to pay the healthcare expenses through the computing system implemented data management system using any one of several payment methods available to the healthcare consumer including, but not limited to: credit cards; debit cards; funds transfers; and checks. One example of a computing system implemented healthcare expense management system is Quicken Health Expense Tracker, available from Intuit Inc., of Mountain View, Calif.

In one embodiment, once a computing system implemented data management system, such as computing system implemented data management system 180 of FIG. 1, is provided at PROVIDE A COMPUTING SYSTEM IMPLEMENTED DATA MANAGEMENT SYSTEM OPERATION 303, process flow proceeds to OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305.

In one embodiment, at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305 the computing system implemented data management system of PROVIDE A COMPUTING SYSTEM IMPLEMENTED DATA MANAGEMENT SYSTEM OPERATION 303 obtains data indicating that a given healthcare consumer utilizing the computing system implemented data management system has access to a healthcare expense account.

Examples of common healthcare expense account programs detected at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305 include, but are not limited to: flexible spending accounts (FSAs); healthcare reimbursement arrangements (HRAs); and healthcare spending accounts (HSAs). Each of these healthcare expense account programs operate to reimburse the healthcare consumer for out of pocket expenses incurred by the healthcare consumer in eligible healthcare expense transactions. However, the funding, lifespan, and portability of these three programs vary significantly.

For instance, in a typical flexible spending account (FSA) program the healthcare consumer must elect to deposit a specified pre-tax dollar amount in the healthcare expense account, i.e., the FSA, to cover healthcare expenses that will occur over a predefined future period. For instance, as one example, the healthcare consumer must elect to deposit a pre-tax dollar amount specified by the healthcare consumer to be paid into the healthcare expense account for pre-tax reimbursement of all eligible healthcare expenses to be incurred in the next 12 months. In many cases, the amount specified by the healthcare consumer is paid by deducting a portion of the specified amount from the healthcare consumer's compensation over multiple pay periods. In other cases, the employer makes contributions to the FSA and the employer deposits funds in the healthcare expense account on a periodic basis.

Using a typical FSA, it is important that a healthcare consumer predict his or her total eligible healthcare expenses fairly accurately. This is because any funds not used to reimburse the healthcare consumer for a transaction occurring within the predefined period, i.e., unused funds, are typically forfeited. Consequently, it is often the case a healthcare consumer would want to utilize FSA funds to pay and/or reimburse healthcare expenses first in order to ensure that he or she does not forfeit any money. However, there are exceptions and the preferred use of FSA funds will vary from healthcare consumer-to-healthcare consumer and situation-to-situation. FSAs are currently the most common form of healthcare expense account programs.

A typical healthcare reimbursement arrangement (HRA) account is very similar to an FSA account except that the HRA account is typically funded by the employer and, in many cases, the healthcare expense account balance remains available to healthcare consumer as long as the healthcare consumer is employed by the employer. Given that HRA funds are kept by the healthcare consumer so long as the healthcare consumer is an employee, HRA funds are often a preferred second source of funding for healthcare expenses, after FSA funds, when both programs are available. However, this is not always the case, particularly if a healthcare consumer plans to change jobs before the end of an FSA predefined period. In addition, certain rates of return and interest considerations may dictate that the HRA funds be used sooner, or, in other cases, later.

Healthcare spending accounts (HSAs) are a federal program whereby a healthcare consumer and/or employer fund the healthcare spending account themselves with pre-tax dollars. The healthcare consumer then reimburses him or herself from the HSA account for eligible healthcare expenses. An HSA is unique in that the account typically remains the property of the healthcare consumer for life. However, funds drawn from the HSA account prior to the defined retirement age must be identified, accounted for, and verified through special tax documentation. Two features make the HSA program unique. First, as noted, the funds remain available to the healthcare consumer for the healthcare consumer's lifetime. In addition, currently, there are few limits on the retroactive use of HSA funds; that is to say, HSA funds can be used to reimburse healthcare expenses years after the expenses are incurred. These unique features of an HSA account often mean that these funds should be preferably accessed only after other sources are depleted, such as FSA and HRA funds. In some cases, if the HSA has a particularly favorable rate of return and/or interest rate, a healthcare consumer may even elect to use tradition checking, savings, debit card, or even credit card, accounts before using HSA funds. However, there are exceptions, and the preferred use of HSA funds will vary from healthcare consumer-to-healthcare consumer and situation-to-situation.

Any healthcare expense account program, whether it be an FSA, an HRA, an HSA, or any other healthcare expense account-type program, known at the time of filing or as developed thereafter, can be used with, and benefit from, process for providing healthcare expense payment recommendations 300 and are, in various embodiments, detected at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305.

In one embodiment, when the computing system implemented data management system obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305, the computing system also obtains data regarding the balance of in the healthcare expense account and/or any conditions or critical dates associated with the healthcare expense account, such as the "use it or lose it" cut-off date.

In one embodiment, data regarding the balance of in the healthcare expense account and/or any conditions or critical dates associated with the healthcare expense account, such as the "use it or lose it" cut-off date is obtained from one or more of, but not limited to: the healthcare consumer; a healthcare expense account administrator; another computing system implemented process, such as a computing system implemented healthcare management system and/or a computing system implemented financial management system; a bank or other financial institution and/or historical account data maintained by the bank or other financial institution; a credit account provider, and/or historical account data maintained by the credit account provider; a database; a web-based system; any third party data gathering and/or storage institution; and/or any other person, party, device, mechanism, or place.

In one embodiment, when the computing system implemented data management system obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305, the computing system also obtains general, or in some embodiments specific, data regarding the operating rules associated with the healthcare expense account.

For instance, in one embodiment, when the computing system implemented data management system obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305, it is determined that the healthcare expense account is a FSA. In this instance data regarding the general operation of FSAs is obtained and/or, in some embodiments, data regarding the specific FSA program is obtained.

In one embodiment, data regarding the operating rules associated with the healthcare expense account is obtained from one or more of, but not limited to: the healthcare consumer; a healthcare expense account administrator; another computing system implemented process, such as a computing system implemented healthcare management system and/or a computing system implemented financial management system; a bank or other financial institution and/or historical account data maintained by the bank or other financial institution; a credit account provider, and/or historical account data maintained by the credit account provider; a database; a web-based system; any third party data gathering and/or storage institution; and/or any other person, party, device, mechanism, or place.

In one embodiment, when the computing system implemented data management system obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305, the computing system also obtains data regarding the operation of the healthcare expense account such as, but not limited to, data representing eligible transactions and terms of use under the one or more accounts and/or interest rates/rates of return associated with the healthcare expense account.

In one embodiment, data representing eligible transactions and terms of use under the one or more accounts and/or interest rates/rates of return associated with the healthcare expense account is obtained from one or more of, but not limited to: the healthcare consumer; a healthcare expense account administrator; another computing system implemented process, such as a computing system implemented healthcare management system and/or a computing system implemented financial management system; a bank or other financial institution and/or historical account data maintained by the bank or other financial institution; a credit account provider, and/or historical account data maintained by the credit account provider; a database; a web-based system; any third party data gathering and/or storage institution; and/or any other person, party, device, mechanism, or place.

In one embodiment, the computing system implemented data management system obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305, and any other data associated with the healthcare expense account, by the healthcare consumer providing the data.

In one embodiment, the healthcare consumer enters the data into a computing system, such as consumer computing system 100 of FIG. 1, implementing the computing system implemented data management system, such as computing system implemented data management system 180 of FIG. 1, using a user interface device such as, but not limited to: a keyboard; such as keyboard 107 of FIG. 1/FIG. 1; a mouse, such as mouse 111 of FIG. 1/FIG. 2; a touchpad; voice recognition software; or any other device and/or system capable of providing user input to a computing system and/or for translating user actions into computing system operations, whether available or known at the time of filing or as developed later.

Returning to FIG. 3, in one embodiment, the computing system implemented data management system obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305 by identifying symbol strings and/or digit sequences unique to healthcare expense account debit and/or credit cards used by the healthcare consumer to pay an expense through the computing system implemented data management system. One embodiment relies on the fact that and/or credit cards issued in association with healthcare expense accounts have specific symbol strings and/or digit sequences that are used only for debit and/or credit cards issued in association with healthcare expense accounts.

In one embodiment, the computing system implemented data management system obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305, and any other data associated with the healthcare expense account, by obtaining data indicating the healthcare consumer's employer from the healthcare consumer's financial data and then obtaining data about employee benefits, and in particular healthcare spending accounts, offered by that employer. In these instances, the computing system implemented data management system obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305 even though the healthcare consumer may not currently be enrolled in the healthcare spending account.

In these instances, using process for providing healthcare expense payment recommendations 300, the healthcare consumer may be provided a model showing the benefits of enrolling in a healthcare expense account program offered to the healthcare consumer, but that is currently not be taken advantage of by the healthcare consumer.

In one embodiment, the computing system implemented data management system obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305, and any other data associated with the healthcare expense account, by analysis of the healthcare consumer's tax records and/or transaction history. In one embodiment, the tax recorded are provided by accessing a computing system implemented data management system such as a computing system implemented tax preparation and/or filing system.

In one embodiment, the computing system implemented data management system obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305, and any other data associated with the healthcare expense account, by any method, means, mechanism, and/or system, for determining that a given healthcare consumer utilizing the computing system implemented data management system has access to a healthcare expense account as discussed herein, and/or as known in the art at the time of filing, and/or as developed after the time of filing.

In one embodiment, once the computing system implemented data management system of PROVIDE A COMPUTING SYSTEM IMPLEMENTED DATA MANAGEMENT SYSTEM OPERATION 303 obtains data indicating that a given healthcare consumer utilizing the computing system implemented data management system has access to a healthcare expense account at OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305 process flow proceeds to THE GIVEN HEALTHCARE CONSUMER INCURS A POTENTIALLY ELIGIBLE HEALTHCARE EXPENSE OPERATION 307.

In one embodiment, at THE GIVEN HEALTHCARE CONSUMER INCURS A POTENTIALLY ELIGIBLE HEALTHCARE EXPENSE OPERATION 307 the given healthcare consumer incurs a healthcare expense that is potentially eligible for payment using the healthcare expense account of OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305.

In one embodiment, at THE GIVEN HEALTHCARE CONSUMER INCURS A POTENTIALLY ELIGIBLE HEALTHCARE EXPENSE OPERATION 307 the given healthcare consumer incurs a healthcare expense that is potentially eligible for payment using the healthcare expense account in the current billing period. That is to say, the potentially eligible healthcare expense is relatively new.

In one embodiment, at THE GIVEN HEALTHCARE CONSUMER INCURS A POTENTIALLY ELIGIBLE HEALTHCARE EXPENSE OPERATION 307 the given healthcare consumer incurs a healthcare expense that is potentially eligible for payment using the healthcare expense account in a previous billing period and that has, in one embodiment, already been paid for using a means other than the healthcare expense account.

In one embodiment, once the given healthcare consumer incurs a healthcare expense that is potentially eligible for payment using the healthcare expense account of OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305 at THE GIVEN HEALTHCARE CONSUMER INCURS A POTENTIALLY ELIGIBLE HEALTHCARE EXPENSE OPERATION 307, process flow proceeds to IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309.

In one embodiment, at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309 the potentially eligible healthcare expense of THE GIVEN HEALTHCARE CONSUMER INCURS A POTENTIALLY ELIGIBLE HEALTHCARE EXPENSE OPERATION 307 is identified by the computing system implemented data management system of PROVIDE A COMPUTING SYSTEM IMPLEMENTED DATA MANAGEMENT SYSTEM OPERATION 303.

In one embodiment, at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309 a potentially eligible healthcare expense from the current billing/analysis period is identified.

In one embodiment, at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309 a potentially eligible healthcare expense from previous billing period is identified that has, in one embodiment, already been paid for using a means other than the healthcare expense account. That is to say, in some embodiments, at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309 historical healthcare spending data is obtained and analyzed and a previously paid, or otherwise processed, potentially eligible healthcare expense is identified. In essence, in these embodiments, process for providing healthcare expense payment recommendations 300 is applied retroactively.

In one embodiment, at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309, the potentially eligible healthcare expense is identified by the computing system implemented data management system when it appears as a transaction, or other entry, in the computing system implemented data management system.

As noted above, in one embodiment, the computing system implemented data management system has the ability to identify and categorize specific financial transactions and/or items as a given "type" or "category" of transaction or item, such as a "healthcare expense transaction" or a "healthcare expense item". In one embodiment, at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309, specific transactions and/or items identified as healthcare expense transactions, or healthcare expense items, are automatically identified as potentially eligible healthcare expenses.

As noted above, in some embodiments, at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309, the computing system implemented data management system has access to data regarding the generalized, or specific, operational rules associated with the healthcare expense account and, in particular, what types of healthcare expenses are potentially eligible for purchase using the healthcare expense account. In these embodiments, at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309, specific transactions and/or items are identified as potentially eligible healthcare expenses using the data regarding the generalized, or specific, operational rules associated with the healthcare expense account.

In one embodiment, at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309, specific transactions and/or items are currently identified as potentially eligible healthcare expenses by the healthcare consumer and/or are identified as potentially eligible healthcare expenses based on analysis of historical categorizations of similar specific transactions and/or items. That is to say, in some embodiments, historical data is analyzed and historical potentially eligible healthcare expenses are identified. Then specific current transactions and/or items are identified as potentially eligible healthcare expenses based on this analysis and how the similar transactions and/or items were treated.

In one embodiment, specific transactions and/or items are identified as potentially eligible healthcare expenses, at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309 by any method, means, mechanism, and/or system for identifying specific transactions and/or items as potentially eligible healthcare expenses, as discussed herein, and/or as known in the art at the time of filing, and/or as developed after the time of filing.

In one embodiment, once the potentially eligible healthcare expense of THE GIVEN HEALTHCARE CONSUMER INCURS A POTENTIALLY ELIGIBLE HEALTHCARE EXPENSE OPERATION 307 is identified by the computing system implemented data management system of PROVIDE A COMPUTING SYSTEM IMPLEMENTED DATA MANAGEMENT SYSTEM OPERATION 303 at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309, process flow proceeds to PROMPT THE GIVEN HEALTHCARE CONSUMER TO REMIND THE HEALTHCARE CONSUMER OF THE HEALTHCARE EXPENSE ACCOUNT AND/OR PROVIDE GUIDANCE REGARDING THE USE OF THE HEALTHCARE EXPENSE ACCOUNT OPERATION 311.

In one embodiment, at PROMPT THE GIVEN HEALTHCARE CONSUMER TO REMIND THE HEALTHCARE CONSUMER OF THE HEALTHCARE EXPENSE ACCOUNT AND/OR PROVIDE GUIDANCE REGARDING THE USE OF THE HEALTHCARE EXPENSE ACCOUNT OPERATION 311 once a specific transaction and/or item is identified as a potentially eligible healthcare expense at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309 by the computing system implemented data management system of PROVIDE A COMPUTING SYSTEM IMPLEMENTED DATA MANAGEMENT SYSTEM OPERATION 303 the healthcare consumer is prompted through the computing system implemented data management system to consider using the healthcare expense account.

In one embodiment, at PROMPT THE GIVEN HEALTHCARE CONSUMER TO REMIND THE HEALTHCARE CONSUMER OF THE HEALTHCARE EXPENSE ACCOUNT AND/OR PROVIDE GUIDANCE REGARDING THE USE OF THE HEALTHCARE EXPENSE ACCOUNT OPERATION 311 once a specific transaction and/or item is identified as a potentially eligible healthcare expense at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309 by the computing system implemented data management system of PROVIDE A COMPUTING SYSTEM IMPLEMENTED DATA MANAGEMENT SYSTEM OPERATION 303, if the healthcare consumer attempts to pay the potentially eligible healthcare expense by any means other than using the healthcare consumer's healthcare expense account of OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305, the healthcare consumer is prompted through the computing system implemented data management system to consider using the healthcare expense account.

In one embodiment, at PROMPT THE GIVEN HEALTHCARE CONSUMER TO REMIND THE HEALTHCARE CONSUMER OF THE HEALTHCARE EXPENSE ACCOUNT AND/OR PROVIDE GUIDANCE REGARDING THE USE OF THE HEALTHCARE EXPENSE ACCOUNT OPERATION 311, the healthcare consumer is prompted through the computing system implemented data management system to consider using the healthcare expense account via a pop-up display or any other sub-display on a display screen of a display device, such as display device 115 of FIG. 1, of a computing system, such as consumer computing system 100 of FIG. 1, implementing the computing system implemented data management system, such as computing system implemented data management system 180 of FIG. 1.

Returning to FIG. 3, in one embodiment, at PROMPT THE GIVEN HEALTHCARE CONSUMER TO REMIND THE HEALTHCARE CONSUMER OF THE HEALTHCARE EXPENSE ACCOUNT AND/OR PROVIDE GUIDANCE REGARDING THE USE OF THE HEALTHCARE EXPENSE ACCOUNT OPERATION 311, the healthcare consumer is prompted through the computing system implemented data management system and the prompt requires a positive action/acknowledgement such as a check box being selected by the healthcare consumer before the prompt screen can be closed or otherwise terminated and/or before any payment can be made through the computing system implemented data management system.

In one embodiment, at PROMPT THE GIVEN HEALTHCARE CONSUMER TO REMIND THE HEALTHCARE CONSUMER OF THE HEALTHCARE EXPENSE ACCOUNT AND/OR PROVIDE GUIDANCE REGARDING THE USE OF THE HEALTHCARE EXPENSE ACCOUNT OPERATION 311, the healthcare consumer is prompted through the computing system implemented data management system and the prompt is in the form of an E-mail or a computer telephony message or even an automatically generated phone call or letter.

In one embodiment, at PROMPT THE GIVEN HEALTHCARE CONSUMER TO REMIND THE HEALTHCARE CONSUMER OF THE HEALTHCARE EXPENSE ACCOUNT AND/OR PROVIDE GUIDANCE REGARDING THE USE OF THE HEALTHCARE EXPENSE ACCOUNT OPERATION 311, the healthcare consumer is prompted through the computing system implemented data management system and the prompt is sent to a portable computer, a workstation, a two-way pager, a cellular telephone, a smart phone, a digital wireless telephone, a personal digital assistant, a server computer, an Internet appliance, or any other device capable of displaying a video and/or audio alert to the user.

In one embodiment, at PROMPT THE GIVEN HEALTHCARE CONSUMER TO REMIND THE HEALTHCARE CONSUMER OF THE HEALTHCARE EXPENSE ACCOUNT AND/OR PROVIDE GUIDANCE REGARDING THE USE OF THE HEALTHCARE EXPENSE ACCOUNT OPERATION 311, the healthcare consumer is prompted through the computing system implemented data management system to consider using the healthcare expense account and is provided data indicating the balance in the healthcare expense account.

In one embodiment, at PROMPT THE GIVEN HEALTHCARE CONSUMER TO REMIND THE HEALTHCARE CONSUMER OF THE HEALTHCARE EXPENSE ACCOUNT AND/OR PROVIDE GUIDANCE REGARDING THE USE OF THE HEALTHCARE EXPENSE ACCOUNT OPERATION 311, the healthcare consumer is prompted through the computing system implemented data management system to consider using the healthcare expense account and is provided data indicating any critical dates associated with the healthcare expense account, such as the "use it or lose it" cut off date.

In one embodiment, once the healthcare consumer is prompted through the computing system implemented data management system to consider using the healthcare expense account at PROMPT THE GIVEN HEALTHCARE CONSUMER TO REMIND THE HEALTHCARE CONSUMER OF THE HEALTHCARE EXPENSE ACCOUNT AND/OR PROVIDE GUIDANCE REGARDING THE USE OF THE HEALTHCARE EXPENSE ACCOUNT OPERATION 311, process flow proceeds to THE GIVEN HEALTHCARE CONSUMER PAYS FOR THE POTENTIALLY ELIGIBLE HEALTHCARE EXPENSE THROUGH THE COMPUTING SYSTEM IMPLEMENTED DATA MANAGEMENT SYSTEM USING THE HEALTHCARE EXPENSE ACCOUNT OPERATION 313.

In one embodiment, at THE GIVEN HEALTHCARE CONSUMER PAYS FOR THE POTENTIALLY ELIGIBLE HEALTHCARE EXPENSE THROUGH THE COMPUTING SYSTEM IMPLEMENTED DATA MANAGEMENT SYSTEM USING THE HEALTHCARE EXPENSE ACCOUNT OPERATION 313 the healthcare consumer is provided the opportunity to pay the potentially eligible healthcare expense of THE GIVEN HEALTHCARE CONSUMER INCURS A POTENTIALLY ELIGIBLE HEALTHCARE EXPENSE OPERATION 307 identified at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309 by the computing system implemented data management system of PROVIDE A COMPUTING SYSTEM IMPLEMENTED DATA MANAGEMENT SYSTEM OPERATION 303 using the healthcare expense account of OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305.

As noted above, in one embodiment, the computing system implemented data management system provided at PROVIDE A COMPUTING SYSTEM IMPLEMENTED DATA MANAGEMENT SYSTEM OPERATION 303 provides the healthcare consumer the capability to pay the healthcare expenses through the computing system implemented data management system using any one of several payment methods available to the healthcare consumer including, but not limited to, a debit and/or credit card associated with healthcare expense accounts. One example of a computing system implemented healthcare expense management system is Quicken Health Expense Tracker, available from Intuit Inc., of Mountain View, Calif.

In other embodiments, at THE GIVEN HEALTHCARE CONSUMER PAYS FOR THE POTENTIALLY ELIGIBLE HEALTHCARE EXPENSE THROUGH THE COMPUTING SYSTEM IMPLEMENTED DATA MANAGEMENT SYSTEM USING THE HEALTHCARE EXPENSE ACCOUNT OPERATION 313 the healthcare consumer is provided the opportunity to pay the potentially eligible healthcare expense of THE GIVEN HEALTHCARE CONSUMER INCURS A POTENTIALLY ELIGIBLE HEALTHCARE EXPENSE OPERATION 307 identified at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309 by the computing system implemented data management system of PROVIDE A COMPUTING SYSTEM IMPLEMENTED DATA MANAGEMENT SYSTEM OPERATION 303 using the healthcare expense account of OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305 by any method, mechanism, means, process, or system discussed herein, and/or known in the art at the time of filing, and/or as developed after the time of filing.

In one embodiment, if the healthcare consumer pays the potentially eligible healthcare expense of THE GIVEN HEALTHCARE CONSUMER INCURS A POTENTIALLY ELIGIBLE HEALTHCARE EXPENSE OPERATION 307 identified at IDENTIFY THE POTENTIALLY ELIGIBLE HEALTHCARE EXPENSE THROUGH THE COMPUTING SYSTEM IMPLEMENTED DATA MANAGEMENT SYSTEM OPERATION 309 by the computing system implemented data management system of PROVIDE A COMPUTING SYSTEM IMPLEMENTED DATA MANAGEMENT SYSTEM OPERATION 303 using the healthcare expense account of OBTAIN DATA INDICATING A GIVEN HEALTHCARE CONSUMER HAS ACCESS TO A HEALTHCARE EXPENSE ACCOUNT AND OBTAIN DATA ASSOCIATED WITH THE HEALTHCARE EXPENSE ACCOUNT OPERATION 305 at THE GIVEN HEALTHCARE CONSUMER PAYS FOR THE POTENTIALLY ELIGIBLE HEALTHCARE EXPENSE THROUGH THE COMPUTING SYSTEM IMPLEMENTED DATA MANAGEMENT SYSTEM USING THE HEALTHCARE EXPENSE ACCOUNT OPERATION 313, process flow proceeds to GENERATE REQUIRED DOCUMENTATION FOR THE HEALTHCARE EXPENSE PAYMENT TRANSACTION THROUGH THE COMPUTING SYSTEM IMPLEMENTED DATA MANAGEMENT SYSTEM OPERATION 315.

In one embodiment, at GENERATE REQUIRED DOCUMENTATION FOR THE HEALTHCARE EXPENSE PAYMENT TRANSACTION THROUGH THE COMPUTING SYSTEM IMPLEMENTED DATA MANAGEMENT SYSTEM OPERATION 315 if the healthcare consumer uses the healthcare expense account to pay the potentially eligible healthcare expense through the computing system implemented data management system at THE GIVEN HEALTHCARE CONSUMER PAYS FOR THE POTENTIALLY ELIGIBLE HEALTHCARE EXPENSE THROUGH THE COMPUTING SYSTEM IMPLEMENTED DATA MANAGEMENT SYSTEM USING THE HEALTHCARE EXPENSE ACCOUNT OPERATION 313, the computing system implemented data management system provides the healthcare consumer with instructions for filing a claim and/or any supporting documentation to the healthcare expense account administrator.

In one embodiment, at GENERATE REQUIRED DOCUMENTATION FOR THE HEALTHCARE EXPENSE PAYMENT TRANSACTION THROUGH THE COMPUTING SYSTEM IMPLEMENTED DATA MANAGEMENT SYSTEM OPERATION 315 the computing system implemented data management system provides the healthcare consumer with instructions for filing a claim and/or any supporting documentation to the healthcare expense account administrator via a help display, such as a "wizard".

In one embodiment, at GENERATE REQUIRED DOCUMENTATION FOR THE HEALTHCARE EXPENSE PAYMENT TRANSACTION THROUGH THE COMPUTING SYSTEM IMPLEMENTED DATA MANAGEMENT SYSTEM OPERATION 315 the computing system implemented data management system provides the healthcare consumer with instructions for filing a claim and/or any supporting documentation to the healthcare expense account administrator via a data download.

In one embodiment, at GENERATE REQUIRED DOCUMENTATION FOR THE HEALTHCARE EXPENSE PAYMENT TRANSACTION THROUGH THE COMPUTING SYSTEM IMPLEMENTED DATA MANAGEMENT SYSTEM OPERATION 315 the computing system implemented data management system provides the healthcare consumer with instructions for filing a claim and/or any supporting documentation to the healthcare expense account administrator via a link to another web-site or database.

In one embodiment, at GENERATE REQUIRED DOCUMENTATION FOR THE HEALTHCARE EXPENSE PAYMENT TRANSACTION THROUGH THE COMPUTING SYSTEM IMPLEMENTED DATA MANAGEMENT SYSTEM OPERATION 315 the computing system implemented data management system provides the healthcare consumer with instructions for filing a claim and/or any supporting documentation to the healthcare expense account administrator via any means, mechanism, method, process, procedure, or system discussed herein, and/or known in the art at the time of filing, and/or as developed after the time of filing for providing data and/or guidance.

In one embodiment, at GENERATE REQUIRED DOCUMENTATION FOR THE HEALTHCARE EXPENSE PAYMENT TRANSACTION THROUGH THE COMPUTING SYSTEM IMPLEMENTED DATA MANAGEMENT SYSTEM OPERATION 315, if the healthcare consumer uses the healthcare expense account to pay the potentially eligible healthcare expense through the computing system implemented data management system at THE GIVEN HEALTHCARE CONSUMER PAYS FOR THE POTENTIALLY ELIGIBLE HEALTHCARE EXPENSE THROUGH THE COMPUTING SYSTEM IMPLEMENTED DATA MANAGEMENT SYSTEM USING THE HEALTHCARE EXPENSE ACCOUNT OPERATION 313, the computing system implemented data management system proactively e-files a claim and/or the supporting documentation to the healthcare expense account administrator on behalf of the healthcare consumer.

In one embodiment, once the computing system implemented data management system provides the healthcare consumer with instructions for filing a claim and/or any supporting documentation to the healthcare expense account administrator and/or the computing system implemented data management system proactively e-files a claim and/or the supporting documentation to the healthcare expense account administrator on behalf of the healthcare consumer at GENERATE REQUIRED DOCUMENTATION FOR THE HEALTHCARE EXPENSE PAYMENT TRANSACTION THROUGH THE COMPUTING SYSTEM IMPLEMENTED DATA MANAGEMENT SYSTEM OPERATION 315 process flow proceeds to EXIT OPERATION 330.

In one embodiment, at EXIT OPERATION 330, process for providing healthcare expense payment recommendations is exited to await new parameters and/or data.

Using process for providing healthcare expense payment recommendations 300, healthcare consumers having access to healthcare expense accounts are provided guidance regarding the operation of the healthcare expense accounts and are alerted to opportunities to utilize their healthcare expense accounts. Therefore, using process for providing healthcare expense payment recommendations 300, healthcare consumers are benefited by being given the understanding and opportunity to properly use their healthcare expense accounts. In addition, employer HR representatives and/or program administrators can save the significant amounts of time currently being devoted to answering questions regarding healthcare expense accounts. Consequently, using process for providing healthcare expense payment recommendations 300, it is more likely: the healthcare consumer will partake in one or more healthcare expense account programs; the healthcare expense account programs will be healthcare consumer and employer friendly; and/or the healthcare consumer will perceive the healthcare expense account programs to be the true benefit they are intended to be.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "accessing", "analyzing", "generating", "storing", "determining", "displaying", "transmitting", "providing", "processing", "prompting", "submitting", "identifying" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus.

Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing healthcare expense payment recommendations comprising;
    one or more processors configured to execute instructions comprising:
    receiving historical financial transaction data of a party, at least a portion of the financial transaction data indicating the party has access to a given healthcare expense account;
    identifying and categorizing individual ones of financial transactions represented in the financial transaction data, the process being configured to automatically categorize individual financial transactions as either of a healthcare expense transaction, a business transaction, or a personal transaction, wherein the process is further configured to identify a healthcare expense transaction by identifying, within a financial transaction, one or more digit sequences unique to healthcare expense account debit cards and healthcare expense account credit cards used by the party to pay an expense;
    obtaining data associated with the given healthcare expense account;
    identifying, of the healthcare expense transactions, a given potentially eligible healthcare expense incurred by the party, the given potentially eligible healthcare expense being potentially eligible for payment using the given healthcare expense account; and
    prompting the party to encourage the party to consider using the given healthcare expense account to pay the given potentially eligible healthcare expense.

2. The computing system implemented process for providing healthcare expense payment recommendations of claim 1, wherein
    the given healthcare expense account is selected from at least one of the group of healthcare expense accounts consisting of:
    a Flexible Spending Account (FSA);
    a Healthcare Reimbursement Account (HRA); and
    a Healthcare Spending Account (HAS).

3. The computing system implemented process for providing healthcare expense payment recommendations of claim 1, wherein
    obtaining data associated with the given healthcare expense account includes obtaining data indicating a balance associated with the given healthcare expense account.

4. The computing system implemented process for providing healthcare expense payment recommendations of claim 1, wherein
    obtaining data associated with the given healthcare expense account includes obtaining data indicating operational rules associated with the given healthcare expense account.

5. The computing system implemented process for providing healthcare expense payment recommendations of claim 1, wherein
obtaining data associated with the given healthcare expense account includes obtaining data indicating types of healthcare expenses eligible for payment using the given healthcare expense account.

6. The computing system implemented process for providing healthcare expense payment recommendations of claim 1, wherein
the prompt used for prompting the party to encourage the party to consider using the given healthcare expense account to pay the given potentially eligible healthcare expense is displayed on a display screen of a display device.

7. The computing system implemented process for providing healthcare expense payment recommendations of claim 1, wherein
the prompt used for prompting the party to encourage the party to consider using the given healthcare expense account to pay the given potentially eligible healthcare expense includes at least part of the data associated with the given healthcare expense account.

8. The computing system implemented process for providing healthcare expense payment recommendations of claim 1, further comprising:
paying, by the party, the given potentially eligible healthcare expense using the given healthcare expense account; and
after the party pays the given potentially eligible healthcare expense using the given healthcare expense account, providing the party guidance associated with providing an administrator of the given healthcare expense account any required documentation associated with the given potentially eligible healthcare expense.

9. The computing system implemented process for providing healthcare expense payment recommendations of claim 1, further comprising:
paying, by the party, the given potentially eligible healthcare expense using the given healthcare expense account; and
after the party pays the given potentially eligible healthcare expense using the given healthcare expense account, automatically e-filing any required documentation associated with the given potentially eligible healthcare expense with an administrator of the given healthcare expense account.

10. A nontransitory computer program product for providing healthcare expense payment recommendations comprising:
a nontransitory computer readable medium;
and computer program code, encoded on the computer readable medium, comprising computer readable instructions which when executed via any set of one or more processors perform a process for:
receiving historical financial transaction data of a party, at least a portion of the financial transaction data indicating the party has access to a given healthcare expense account;
identifying and categorizing individual ones of financial transactions represented in the financial transaction data, the process being configured to automatically categorize individual financial transactions as either of a healthcare expense transaction, a business transaction, or a personal transaction, wherein the process is further configured to identify a healthcare expense transaction by identifying, within a financial transaction, one or more digit sequences unique to healthcare expense account debit cards and healthcare expense account credit cards used by the party to pay an expense;
obtaining data associated with the given healthcare expense account;
identifying, of the healthcare expense transactions, a given potentially eligible healthcare expense incurred by the party, the given potentially eligible healthcare expense being potentially eligible for payment using the given healthcare expense account; and
prompting the party to encourage the party to consider using the given healthcare expense account to pay the given potentially eligible healthcare expense.

11. The nontransitory computer program product for providing healthcare expense payment recommendations of claim 10 wherein
the given healthcare expense account is selected from at least one of the group of healthcare expense accounts consisting of:
a Flexible Spending Account (FSA);
a Healthcare Reimbursement Account (HRA); and
a Healthcare Spending Account (HAS).

12. The nontransitory computer program product computer for providing healthcare expense payment recommendations of claim 10 wherein
obtaining data associated with the given healthcare expense account includes obtaining data indicating a balance associated with the given healthcare expense account.

13. The nontransitory computer program product for providing healthcare expense payment recommendations of claim 10 wherein
obtaining data associated with the given healthcare expense account includes obtaining data indicating operational rules associated with the given healthcare expense account.

14. The nontransitory computer program product for providing healthcare expense payment recommendations of claim 10 wherein
obtaining data associated with the given healthcare expense account includes obtaining data indicating types of healthcare expenses eligible for payment using the given healthcare expense account.

15. The nontransitory computer program product for providing healthcare expense payment recommendations of claim 10 wherein
the prompt used for prompting the party to encourage the party to consider using the given healthcare expense account to pay the given potentially eligible healthcare expense is displayed on a display screen of a display device.

16. The nontransitory computer program product for providing healthcare expense payment recommendations of claim 10 wherein
the prompt used for prompting the party to encourage the party to consider using the given healthcare expense account to pay the given potentially eligible healthcare expense includes at least part of the data associated with the given healthcare expense account.

17. The nontransitory computer program product for providing healthcare expense payment recommendations of claim 10, further comprising:
paying, by the party, the given potentially eligible healthcare expense using the given healthcare expense account; and
after the party pays the given potentially eligible healthcare expense using the given healthcare expense account, providing the party guidance associated with providing an administrator of the given healthcare expense account any required documentation associated with the given potentially eligible healthcare expense.

18. The nontransitory computer program product for providing healthcare expense payment recommendations of claim 10, further comprising:

paying, by the party, the given potentially eligible healthcare expense using the given healthcare expense account; and after the party pays the given potentially eligible healthcare expense using the given healthcare expense account, automatically e-filing any required documentation associated with the given potentially eligible healthcare expense with an administrator of the given healthcare expense account.

* * * * *